(12) United States Patent
Chen et al.

(10) Patent No.: US 11,055,403 B2
(45) Date of Patent: Jul. 6, 2021

(54) METHOD, SYSTEM, AND COMPUTER PROGRAM PRODUCT FOR APPLICATION IDENTIFICATION IN A CLOUD PLATFORM

(71) Applicant: International Business Machines Corporation, Armonk, NY (US)

(72) Inventors: Peng Fei Chen, Haidian District (CN); Fan Jing Meng, Haidian District (CN); Jing Min Xu, Haidian District (CN); Lin Yang, Haidian District (CN); Xiao Zhang, Haidian District (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 15/400,383

(22) Filed: Jan. 6, 2017

(65) Prior Publication Data
US 2018/0196684 A1     Jul. 12, 2018

(51) Int. Cl.
| | | |
|---|---|---|
| *G06F 21/55* | (2013.01) | |
| *G06F 21/53* | (2013.01) | |
| *G06F 9/455* | (2018.01) | |
| *G06F 16/14* | (2019.01) | |
| *G06F 8/41* | (2018.01) | |
| *G06F 21/64* | (2013.01) | |

(52) U.S. Cl.
CPC .............. *G06F 21/552* (2013.01); *G06F 8/41* (2013.01); *G06F 16/152* (2019.01); *G06F 21/53* (2013.01); *G06F 21/64* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 6,718,540 | B1 * | 4/2004 | Azua | G06F 9/45508 |
| | | | | 717/147 |
| 7,877,642 | B2 * | 1/2011 | Ding | G06F 11/3636 |
| | | | | 717/133 |
| 9,256,636 | B2 | 2/2016 | Rash et al. | |
| 9,342,343 | B2 | 5/2016 | Sonnek | |
| 9,354,977 | B1 * | 5/2016 | Backensto | G06F 11/1471 |
| 9,390,268 | B1 | 7/2016 | Martini et al. | |

(Continued)

OTHER PUBLICATIONS

Ahn et al., SigMR: MapReduce-based SPARQL query processing by signature encoding and multi-way join, 2015, Springer Science + Business Media New York (Year: 2015).*

(Continued)

*Primary Examiner* — Lewis A Bullock, Jr.
*Assistant Examiner* — Melissa A Headly
(74) *Attorney, Agent, or Firm* — Joseph Petrokaitis, Esq.; McGinn I.P. Law Group, PLLC.

(57) ABSTRACT

A method, system, and computer program product, include extracting information related to one or more processes of one or more applications running on a virtual machine from a memory of the virtual machine, building at least one first application signature based on the extracted information, and identifying the one or more applications running on the virtual machine by matching the at least one first application signature with one or more second application signatures previously stored.

18 Claims, 5 Drawing Sheets

(56) References Cited

U.S. PATENT DOCUMENTS

| | | | | |
|---|---|---|---|---|
| 2012/0246647 | A1* | 9/2012 | Ciano | G06F 9/45533 |
| | | | | 718/1 |
| 2013/0198571 | A1* | 8/2013 | Brewerton | G06F 11/10 |
| | | | | 714/37 |
| 2014/0095718 | A1* | 4/2014 | Daly | G06F 9/5033 |
| | | | | 709/226 |
| 2016/0259658 | A1* | 9/2016 | Gocek | G06F 9/45558 |
| 2017/0286261 | A1* | 10/2017 | Li | G06F 8/315 |

OTHER PUBLICATIONS

Mel, et al. "The NIST Definition of Cloud Computing". Recommendations of the National Institute of Standards and Technology. Nov. 16, 2015.

* cited by examiner

METHOD, SYSTEM, AND COMPUTER PROGRAM PRODUCT FOR APPLICATION IDENTIFICATION IN A CLOUD PLATFORM

BACKGROUND

The present invention relates to the field of application management, and more specifically, to a method, a system and a computer program product for application identification in a cloud platform.

In a could platform, some applications running in a virtual machine (VM) of this cloud platform might abuse the cloud resources in an abnormal way, which may cause other applications running in the virtual and even the cloud platform to be crashed. Some of these applications are malware applications. For example, a malware can jeopardize a cloud platform by causing memory leaks, or Distributed Denial of Service (DDoS) attacks. Some applications are not malwares, but they are on the black list. For example, applications for P2P service or Bitcoin mining will consume many resources of a cloud platform so that it cannot provide normal services with high performance. That is, some applications running in a VM might bring serious security and performance problems. Therefore, there is a need for the cloud platform provider to discover which applications are running in each VM of this cloud platform.

To discover the applications running in a VM, there was proposed a touch based method. Specifically, this kind of method can obtain the application-related information by installing agents or periodically running shell scripts in the VM (i.e., so-called "touch").

To discover the applications running in a VM, there was also proposed a touchless based method. The word "touchless" means that the processing of this method is performed outside of the monitored VM. Specifically, this kind of method can identify applications either by scanning the port number used by known applications or by analyzing the traffic characteristics. For example, this method can identify apache web server by scanning a port number 80.

SUMMARY

In an exemplary embodiment, the present invention can provide a computer-implemented method for application identification, the method including extracting information related to one or more processes of one or more applications running on a virtual machine from memory of the virtual machine, building at least one first application signature based on the extracted information, and identifying the one or more applications running on the virtual machine by matching the at least one first application signature with one or more second application signatures previously stored.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
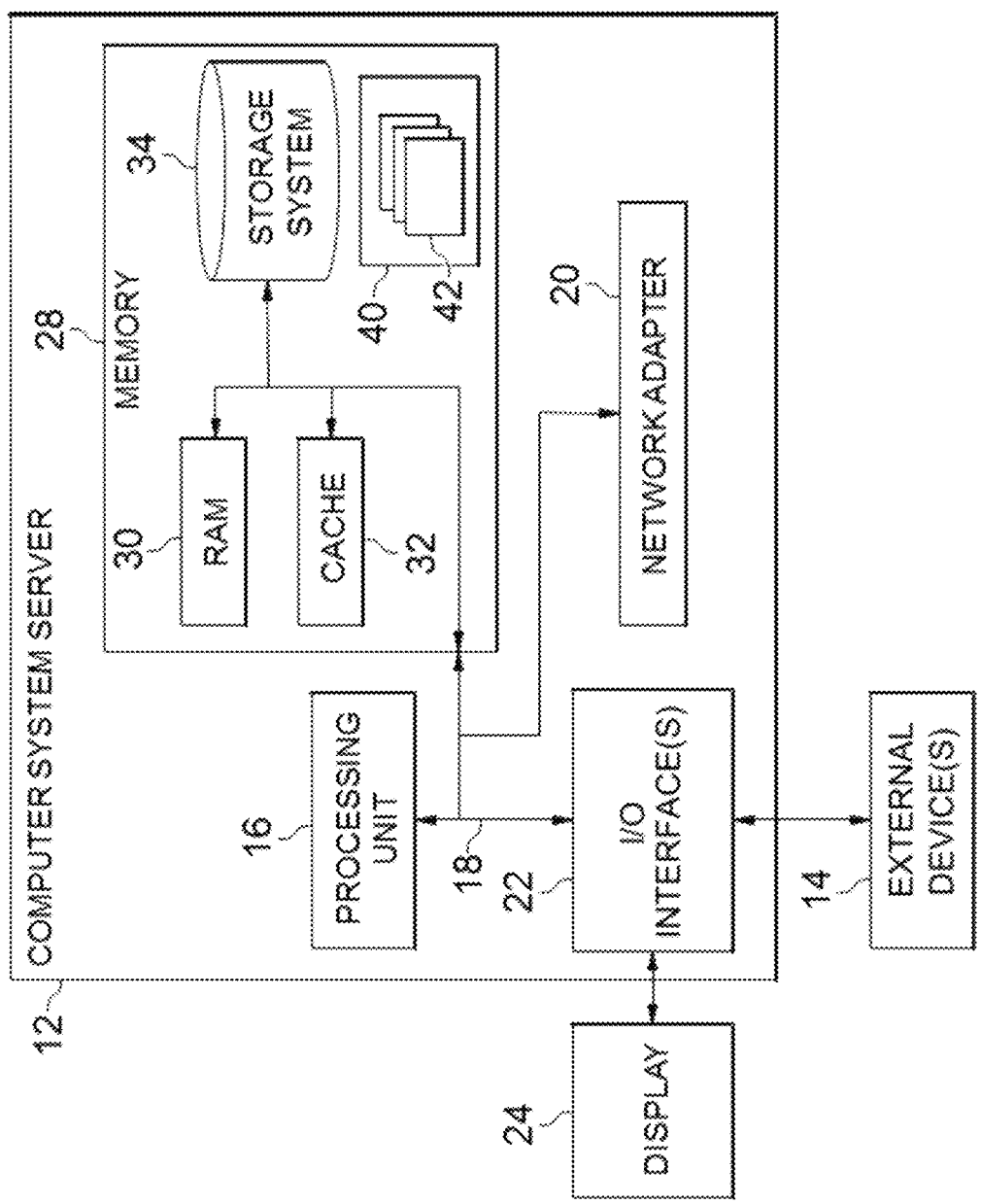
FIG. 1 depicts a cloud computing node 10 according to an embodiment of the present invention.

The invention will now be described with reference to FIG. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 4:
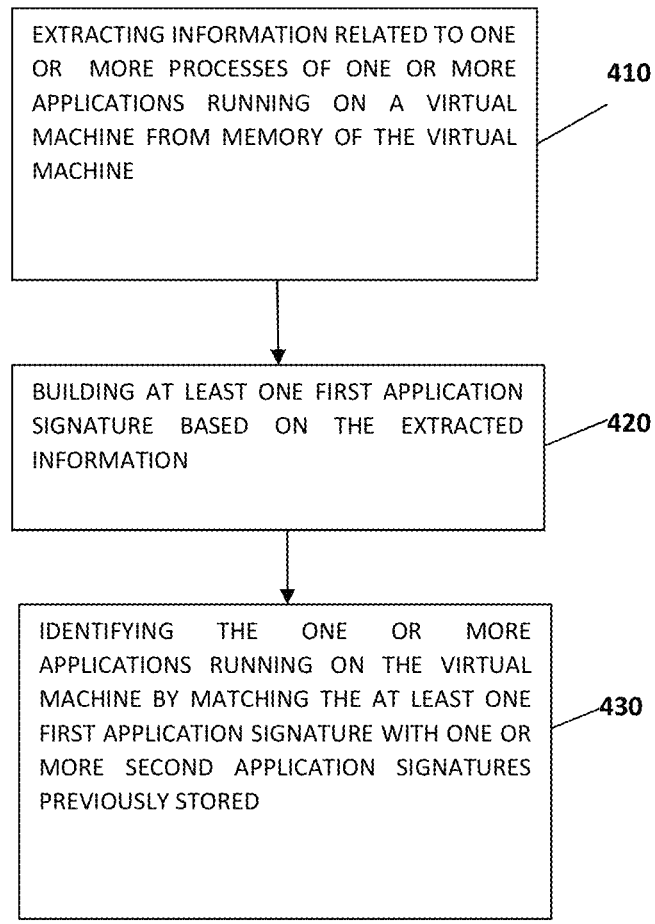
FIG. 4 is a flowchart illustrating a method for application identification according to an embodiment of the present invention.

With reference now to the example depicted in FIG. 4, the method 400 includes various steps for application identification. As shown in at least FIG. 1, one or more computers of a computer system 12 according to an embodiment of the present invention can include a memory 28 having instructions stored in a storage system to perform the steps of FIG. 4.

Although one or more embodiments (see e.g., FIGS. 1-3) may be implemented in a cloud environment 50 (see e.g., FIG. 2), it is nonetheless understood that the present invention can be implemented outside of the cloud environment.

The inventors of the present invention found that, the current touch based method requires a privilege to access to the VM to run the installed agents or shell scripts. It is not possible for an operator of a cloud platform to discover which applications are running on a VM belonging to a tenant, since it does not have the privilege to access. Additionally, the touch based method is performed from inside the monitored VM, which causes additional overhead in the monitored VM.

Further, the inventors of the present invention found that, the current touchless based method cannot adapt to the changing environment. For example, in the case where a port number used by an application has been changed manually from its original standard port number, this touchless based method does not work. Moreover, this touchless based method cannot discover the applications that run stand alone (that is, they do not communicate with other applications).

To address this problem, the inventors of the present invention introduce an improved touchless based method for application identification.

With reference now to FIG. 4, FIG. 4 is a flowchart illustrating a method for application identification according to an embodiment of the present invention. As shown in FIG. 4, the method for application identification includes a memory information extracting step 410, an application signature building step 420, and an application identifying step 430. In one embodiment of the invention, the method in FIG. 4 will be performed when the operator or management module of the cloud platform intends to discover which applications are running on each VMs of the cloud platform. In another embodiment of the invention, the method in FIG. 4 will be performed periodically. Normally, there are a plurality of VMs in a cloud platform. The method in FIG. 4 is performed with respect to at least one of the plurality of VMs respectively, to discover which applications are running in each of the VMs. Hereinafter, respective steps of the method for application identification in FIG. 4 will be explained in detail.

Specifically, in the memory information extracting step 410, information related to one or more processes of one or more applications running on a virtual machine from memory of the virtual machine is extracted. As known to those skilled in the art, a process of an application running on a VM will occupy a space in memory (e.g., RAM) of the VM. The processes of running applications are managed by operating system. The applications run in user space of the memory, but the operating system runs in kernel space of the memory. For managing the running of processes of applications, information related to the running applications are stored in kernel space of the memory. This kind of information may include at least one of the following information items for an application: process ID (PID), thread ID (TID), command line (or process name), user, type, device, size, node, and name and path of an opened resource. These are only some examples of information items illustrated for description, and other information items are also stored in the kernel space. These information items are called kernel objects hereinafter. It is a problem that the information we need is stored in the kernel space.

Figures 5, 6:
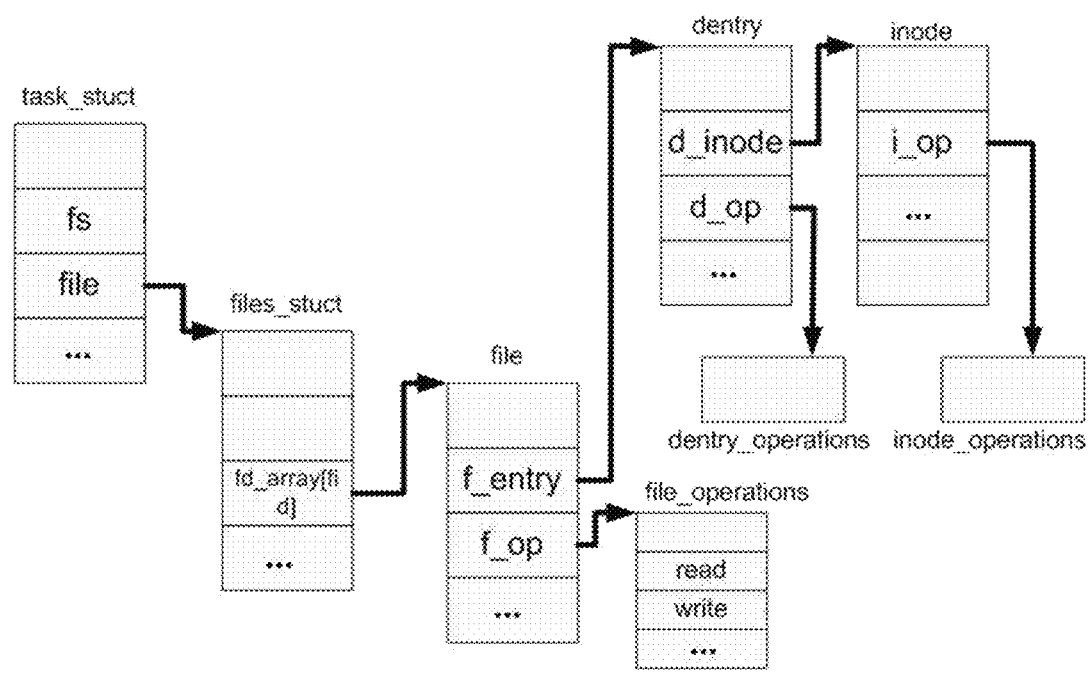
FIG. 5 shows a part of binary content of an application in the kernel space.
FIG. 6 shows an example of the structure of a process stored in the kernel space of Linux.

Another problem is that, in the memory, the structure of a process managed by the operation system is stored in a binary format, and is not readable normally. Some information items related to the process (i.e., kernel objects) are stored with values and are not in succession. FIG. 5 shows a part of binary content of a managed application in the kernel space. In FIG. 5, "^@" represents information that cannot be resolved. In FIG. 5, in addition to the "^@", there are also numbers such as "<80>" and "<98>" and strings such as "_text", which are kernel objects that can be resolved.

Nowadays, there are some virtual machine introspection (VMI) tools or libraries that can be used to do the above job, i.e., acquiring kernel objects from the kernel space. Libvmi is an example of this kind of VMI library. The libvmi library can be used to extract the value of a kernel object from the kernel space at least based on input virtual address.

In one embodiment of the invention, extracting information related to one or more processes of one or more applications running on a virtual machine from memory of the virtual machine comprises: extracting information related to opened resources based on addresses calculated from offsets of kernel objects of operating system. The inventors of the present invention found that, operating systems normally provide a fixed structure for a process in the kernal space. FIG. 6 shows an example of the structure of a process stored in the kernel space of Linux. In Linux, each process has a structure "task_struct" in the kernel space. The structure "files_struct" records usage of file descriptors of a process. The structure "file" represents an opened file by the process. Each opened file in the system has an associated structure "file" in the kernel space. When a file F is opened in a process, actually a structure "dentry" and a structure "Mode" of the file F is created in memory and linked to the process. For example, the kernel object of file name can be obtained from a variable "d_name" in the structure "dentry" that the pointer "f_entry" of the sturcture "file" points to.

In a word, the structures related to processes stored in the kernel space have fixed structures in terms of positions and sizes. For example, the structures of "task_struct" are stored in succession in memory, each of which has a fixed size and represents a process. Thus, knowing the base address of a "task_struct" and sizes of each objects in these structures, it is possible to calculate a virtual address of an kernal object that you want to find its value. For example, if you know the base address of the structure "task_struct" is 10000, offset of the structure "files_struct" is 3000, offset of the structure "file" is 500, offset of the sturcture of "dentry" is 70, and offset of the variable "d_name" in the "dentry" is 9, then the calculated address for the name of this opened file would be 10000+3000+500+70+9=13579. The actual calculation is similar to the above calculation and based on actual base address and offsets.

Although the structures of a process in the memory are described with an example of Linux, the present invention also applies to other operating systems such as Windows. While Windows has different structures in memory for managing a process, these structures are also fixed in terms of positions and sizes. In Linux, the extracting operation can start from "init_task", which represents the first process; and in Windows, the extracting operation can start from "PsActiveProcessHead", which points to the first process.

In one embodiment of the invention, the information related to one or more processes of one or more applications may include information related to opened resources of the processes. The opened resources may include at least one of opened file and opened network connection. Actually, in Linux and some other operating systems, a network connection is also treated as an opened file, and the same or similar structures are used to represent an opened network connection in memory. In another embodiment of the invention, the information related to processes of applications may include information of the processes that is not related to the opened resources, such as the process name alone.

In one embodiment of the invention, by using the libvmi library with calculated addresses for specific kernel objects, it is possible to extract information related to all opened resources of a process. For example, by using the libvmi library, for example, the following information in Table 1 can be extracted for an opened file:

TABLE 1

| PID | Process Name | Opened File |
| --- | --- | --- |
| 24 | apache2 | /bin/apache2 |

The above example only provides a simple example for describing extracted information for one single opened file. By programming with the libvmi library, one can use the address of PID to extract the PID, use the address of kernel object storing the process name to extract the process name, and use the address of kernel object storing the name of opened file to extract file name of the opened file. In an embodiment of the invention, the memory information extracting step 410 may extract the following information in Table 2.

TABLE 2

| No. | Command | PID | TID | USER | SIZE | FILE NAME |
|---|---|---|---|---|---|---|
| 1 | apache2 | 17756 | 17765 | A | 22536 | mod_status.so |
| 2 | apache2 | 17756 | 17765 | A | 14344 | mod_setenvif.so |
| 3 | apache2 | 17756 | 17765 | A | 34832 | mod_negotiation.so |
| 4 | apache2 | 17756 | 17765 | A | 18440 | mod_mime.so |
| 5 | apache2 | 17756 | 17765 | A | 10248 | mod_env.so |
| 6 | apache2 | 17756 | 17764 | A | 0t0 | *:80 |
| 7 | mysqld | 17789 | 17797 | B | 40801 | libpthread.so |

The extracted information in Table 2 is only an example. In this table, each row represents extracted information related to one opened resource. For example, the sixth row represents an opened network connection at port number 80, which is treated in the same way as an opened file. In addition to the fields in the above table, other information items can be extracted as additional columns, such as type of the opened resource (socket, IPv6, FIFO, or real file), device or node on which the process runs, or path of the opened file. It is noted that, in the above table, the column "COMMAND" is equivalent to the process name, and the column "SIZE" represents the size of the opened resource (for an opened network connection, it is recorded as "0t0").

Now referring back to FIG. 4, in the application signature building step 420, at least one first application signature is built based on the extracted information. In one embodiment of the invention, the at least one first application signature may be built for each of the opened resources, based on the extracted information. Taking the above Table 2 as an example, for each row (that is, for each opened resource), a first application signature can be built. In one embodiment of the invention, for example, from information in the third row in Table 2, the following first application signature can be built.

```
Resource3 {
        "Opened_file": ["mod_negotiation.so"]
        "CommandLine": ["apache2"]
    "Size": 34832
}
```

Although the first application signature Resource3 is written in a JavaScript Object Notation (JSON) format, other data structures can be used to record it, such as Comma-Separated Values (CSV). For information in other rows in Table 2, similar first application signatures can be built. The first application signature Resource3 is only an example. Other extracted information can be also included in this first application signature, such as user or PID. Similarly, from information in the sixth and seventh rows in Table 2, the following first application signatures can be built.

```
Resource6 {
        "Port_number": 80
        "CommandLine": ["apache2"]
    "Size": 0
}
Resource7 {
        "Opened_file": ["libpthread.so"]
        "CommandLine": ["mysqld"]
    "Size": 40801
}
```

It is enough to build a first application signature on the basis of opened resources if an application can be identified by a single opened resource. For example, if a specific file X will only be opened by application Y, then finding file X being opened will identify that application Y is running on the VM. However, in a more complex case, if it needs more than one opened resources to identify an application, the first application signature can be built on the basis of processes. In another embodiment of the invention, the at least one first application signature can be built for each of the processes, based on the extracted information. Taking the above Table 2 as an example again, the following first application signatures can be built.

```
Process1 {
        "Process_ID": 17756
        "Opened_files":  ["mod_negotiation.so",  "mod_status.so",
                        "mod_setenvif.so", "mod_mime.so",
                        "mod_env.so"]
        "Port_number": 80
        "CommandLine": ["apache2"]
}
Process2 {
        "Process_ID": 17789
        "Opened_files": ["libpthread.so"]
        "CommandLine": ["mysqld"]
}
```

The above examples are only given for describing the invention. Other form of first application signatures can be used as long as it can include information specific to a process or an application.

Now referring back to FIG. 4, in the application identifying step 430, the one or more applications running on the virtual machine are identified by matching the at least one first application signature with one or more second application signatures previously stored. The one or more second application signatures can be used to distinguish different applications.

In one embodiment of the invention, the second application signatures form a database, in which each of the second application signatures corresponds to an application and is used as the "signature" of this application. In one embodiment of the invention, the second application signatures previously stored may be obtained by compiling source codes of known applications and extracting information from the compilation information generated during the compiling. To obtain such a database, the user of the method in FIG. 4 may find sources code of various applications, e.g., from the Github website, in which source codes of many applications can be found. After obtaining these source codes, the user of the method may compile source code of each application to generate compilation information. Information that can distinguish different application, such as names of opened sources, can be obtained from the compilation information. Considering that new applications come out continuously, it is difficult for a single person to collect the second application signatures of all applications. In another embodiment of the invention, the second application signatures previously stored are obtained by crowdsourcing. That is, every person or organization could upload or input his/its found second application signature of an application to a website, for example; and all of these second application signatures will form a shared database for identifying applications running on VMs. In this case, hopefully, any newly emerged or upgraded applications will have a signature in the database and thus can be identified. In another embodiment of the invention, the database can be created by combining the way of compiling and the way of crowdsourcing.

To distinguish different applications, in one embodiment of the invention, the second application signature may include information related to at least one of: one or more opened files of an application; one or more opened network ports of an application; and operation behavior pattern for opened resources. That is, to identify an application, we need to find out which files this application has opened, which ports this application uses to communicate, and how the opened files or used ports change over time. Examples of second application signatures could be:

```
file "abc.lib" is opened;
both of files "abc.lib" and "ddd.lib" are opened;
file "abc.lib" is opened and port 80 is used;
file "abc.lib" is opened and "eee.lib" is not opened; and
file "fff.lib" is opened for writing and closed after the writing operations.
```

As can be seen from the above examples, the second application signatures can be very flexible, which depends on the scenario of usage. For the last example above, it shows what operation behavior pattern is. For example, the operation sequence regarding opening, closing, reading or writing can be used as the second application signature. In one embodiment of the invention, the second application signature can be also stored in the JSON format, like the first application signature. Of course, other data structures can be used to record it, such as CSV.

To quickly matching the built first application signatures and the stored second application signatures, in one embodiment of the invention, matching the at least one first application signature with one or more second application signatures previously stored in the application identifying step 430 may comprise matching the at least one first application signature with the one or more second application signatures in parallel. For example, in one embodiment of the invention, the matching can be performed in parallel by using MapReduce from Spark or Hadoop.

Taking the above Table 2 as an example again, in the case where the at least one first application signature is built for each of the opened resources, a second application signature requiring a single opened resource is applicable. In this case, the seven rows of Table 2 can be processed in parallel by using MapReduce. For example, the second application signature could be as follows.

```
Apache2 {
        "Opened_file": ["mod_negotiation.so"]
        "CommandLine": ["apache2"]
    "Size": 34832
}
```

For simplicity, we assume that, as long as the fields of "Opened_file" and "CommandLine" of a first application signature, such as Resource3, Resource6, Resource7, are matched with the same fields in the second application signature Apache2, the application Apache2 is identified as running on the VM. In this case, in the Map operation, all of the first application signatures such as Resource3, Resource6, Resource6 are matched with the second application signature, i.e., Apache2 and other second application signatures in parallel. For example, Resource6 and Resource7 can be processed by different processing units of Spark or Hadoop at the same time. For example, for the example in Table 2, after Map operations, the following results can be obtained.

(VM1, Apache2)
(VM1, Mysqld)

Here, VM1 represents the name of the virtual machine and can be obtained from the cloud platform. In this example, the Reduce operation will do nothing. In another example, if duplicate tuples appear, the Reduce operation is to count the duplicate tuples. The final identification result for this example shows there are two applications named "Apache2" and "Mysql" running on virtual machine VM1.

Taking the above Table 2 as an example again, in the case where the at least one first application signature is built for each of the processes, a second application signature requiring one or more opened resource is applicable. In this case, the two processes of Table 2 can be processed in parallel by using MapReduce. For example, the second application signatures could be as follows.

```
Apache2 {
        "Opened_files": ["mod_negotiation.so", "mod_status.so"]
        "CommandLine": ["apache2"]
}
Mysql {
        "Opened_files": ["libpthread.so", "sql.so"]
        "CommandLine": ["mysqld"]
}
```

For simplicity, we assume that, as long as the field of "Opened_files" of the first application signature such as Process1 and Process2 contains all of the file names in the same field of the second application signature, the application Apache2 is identified as running on the VM. In this case, in the Map operation, all of the first application signatures such as Process1 and Process2 are matched with the second application signature, i.e., Apache2 and other second application signatures in parallel. For example, Process1 and Process2 can be processed by different processing units of Spark or Hadoop at the same time. For example, for the example in Table 2, after Map operations, the following results can be obtained.

(VM1, Apache2)

Here, since Process1 opens the two files "mod_negotiation.so" and "mod_status.so" required by the second application signature Apache2, it is identified as belong to the application "Apache2" that is running on the virtual machine VM1. However, for Process2, since it only opens the file "libpthread.so" but does not open the file "sql.so", it is not identified as belonging to the application "Mysql". Of course, it might belong to another application, and the corresponding second application signature and the identification are not shown here for simplicity. Likewise, in this case, the Reduce operation does nothing.

In another embodiment of the invention, the different applications also include different versions of a same application. That is, different versions of an application can be also deemed as different application and need to be identified. In one embodiment, since different versions have different sizes, by matching the above "Size" field in the first application signatures with the same field in the second application signatures which may also include a version field, the following identification result can be obtained as an example.

(VM1, Apache2, v1)
(VM1, Apache2, v2)

If the two triples are obtained from the different processes, they can be kept since there might be two versions of apache running at the same time. However, if the two triples are obtained from the same process, which means the Map operations is on the basis of opened resources, in this case, after the Reduce operation (counting operation), only one triple with higher count is kept as correct identification result.

The method according to embodiments of the invention can be performed with respect to multiple VMs respectively. For each VM, applications running on the VM are identified. The method according to embodiments of the invention is lightweight since it does not add any burden to the monitored VM. The method according to embodiments of the invention is touchless since it does not need privilege to access the monitored VM. Additionally, the method according to embodiments of the invention can identify applications that do not communicate with an entity outside of the monitored VM.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a system for application identification. The system comprises one or more processors and a memory coupled to at least one of the one or more processors. The system comprises a set of computer program instructions stored in the memory and executed by at least one of the one or more processors in order to perform action of extracting information related to one or more processes of one or more applications running on a virtual machine from memory of the virtual machine. The system comprises a set of computer program instructions stored in the memory and executed by at least one of the one or more processors in order to perform action of building at least one first application signature based on the extracted information. The system comprises a set of computer program instructions stored in the memory and executed by at least one of the one or more processors in order to perform action of identifying the one or more applications running on the virtual machine by matching the at least one first application signature with one or more second application signatures previously stored.

In one embodiment of the system, wherein the information related to one or more processes of one or more applications includes information related to opened resources of the processes.

In one embodiment of the system, wherein extracting information related to one or more processes of one or more applications running on a virtual machine from memory of the virtual machine further comprises: extracting information related to opened resources based on addresses calculated from offsets of kernel objects of operating system.

In one embodiment of the system, wherein the second application signatures previously stored are obtained by at least one of: compiling source codes of known applications and extracting information from the compilation information generated during the compiling; and crowdsourcing.

In one embodiment of the system, wherein matching the at least one first application signature with one or more second application signatures previously stored further comprises matching the at least one first application signature with the one or more second application signatures in parallel.

In one embodiment of the system, wherein the second application signature can also be used to distinguish different versions of a same application.

In one embodiment of the system, wherein the second application signature includes information related to at least one of: one or more opened files of an application; one or more opened network ports of an application; and operation behavior pattern for opened resources.

In one embodiment of the system, wherein the at least one first application signature is built for each of the processes, or the at least one first application signature is built for each of the opened resources, based on the extracted information.

In an embodiment of the present invention, there is provided a computer program product for application identification. The computer program product comprising a computer readable storage medium having program instructions embodied therewith. The program instructions being executable by a device to perform a method. The method comprises extracting information related to one or more processes of one or more applications running on a virtual machine from memory of the virtual machine. The method further comprises building at least one first application signature based on the extracted information. The method further comprises identifying the one or more applications running on the virtual machine by matching the at least one first application signature with one or more second application signatures previously stored.

In one embodiment of the computer program product, wherein the information related to one or more processes of one or more applications includes information related to opened resources of the processes.

In one embodiment of the computer program product, wherein extracting information related to one or more processes of one or more applications running on a virtual machine from memory of the virtual machine further comprises: extracting information related to opened resources based on addresses calculated from offsets of kernel objects of operating system.

In one embodiment of the computer program product, wherein the second application signatures previously stored are obtained by at least one of: compiling source codes of known applications and extracting information from the compilation information generated during the compiling; and crowdsourcing.

In one embodiment of the computer program product, wherein matching the at least one first application signature with one or more second application signatures previously stored further comprises matching the at least one first application signature with the one or more second application signatures in parallel.

In one embodiment of the computer program product, wherein the second application signature can also be used to distinguish different versions of a same application.

In one embodiment of the computer program product, wherein the second application signature includes information related to at least one of: one or more opened files of an application; one or more opened network ports of an application; and operation behavior pattern for opened resources.

In one embodiment of the computer program product, wherein the at least one first application signature is built for each of the processes, or the at least one first application signature is built for each of the opened resources, based on the extracted information.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 2:
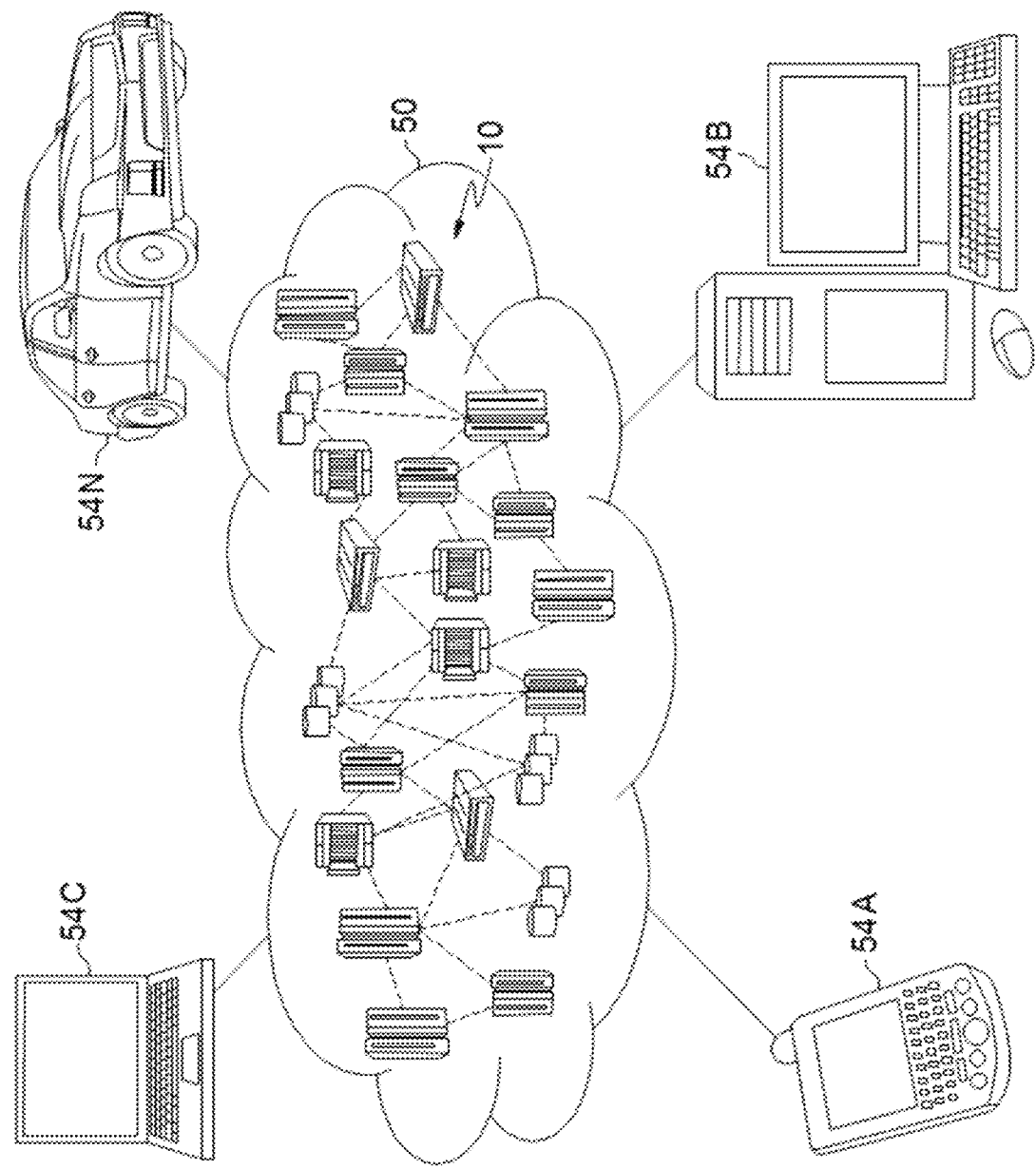
FIG. 2 depicts a cloud computing environment 50 according to an embodiment of the present invention.

Referring now to FIG. 2, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 2 are intended to be illustrative only and that computing nodes 10 and cloud-computing environment 50 can communicate with any type of computerized circuit over any type of network and/or network addressable connection (e.g., using a web browser).

Figure 3:
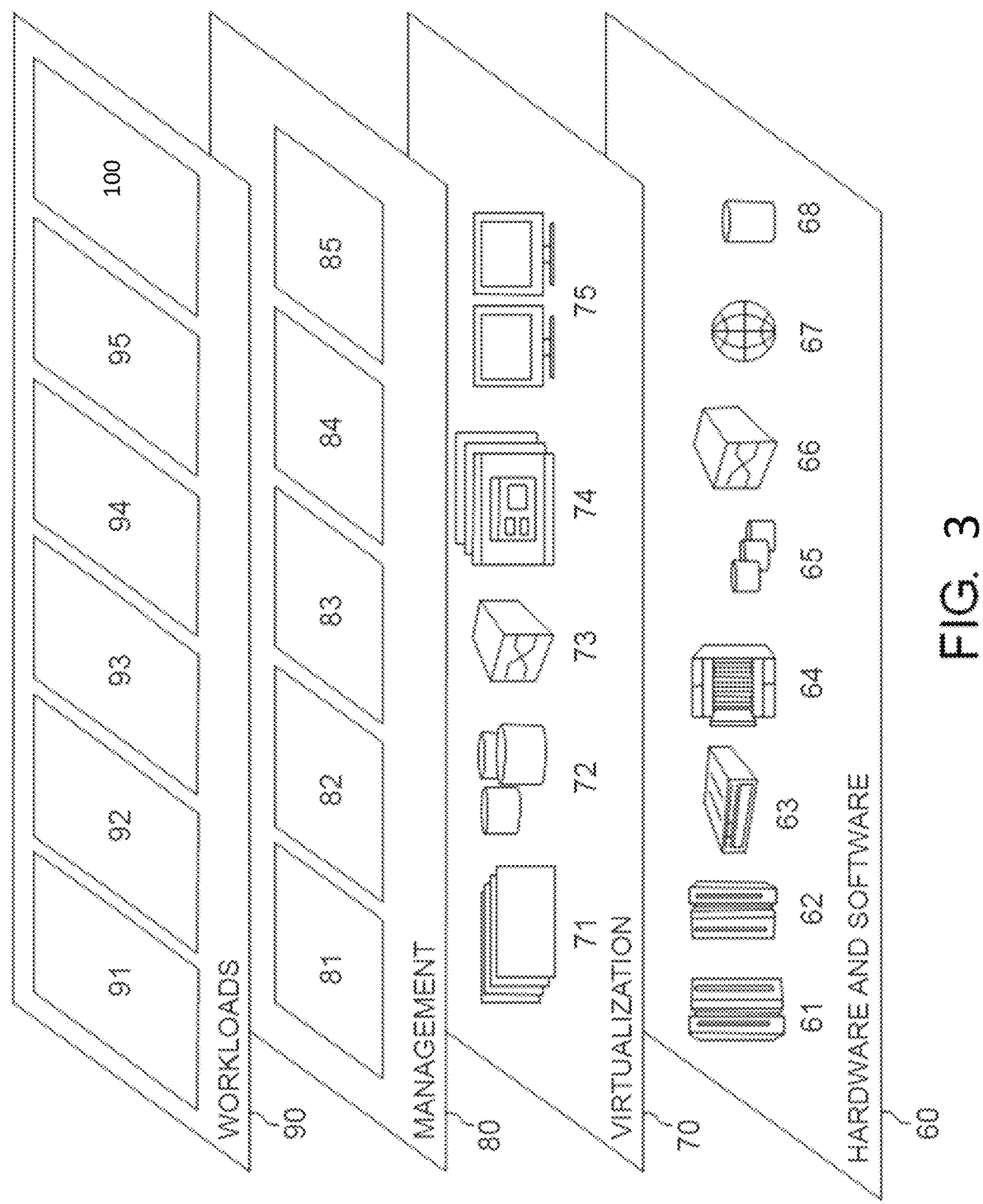
FIG. 3 depicts abstraction model layers according to an embodiment of the present invention.

Referring now to FIG. 3, an exemplary set of functional abstraction layers provided by cloud-computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 400.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for application identification, the method comprising:
    extracting information related to one or more processes of one or more applications running on a virtual machine from a kernel space in a memory of the virtual machine in a cloud environment, wherein the extracting identifies the running applications based on structures related to processes stored in the kernel space which includes fixed structures in terms of positions and sizes;
    building at least one first application signature based on the extracted information; and
    identifying the one or more applications running on the virtual machine by matching the at least one first application signature with one or more second application signatures previously stored from a database in which each of the second application signatures corresponds to an application and is used as the signature of the application,
    wherein the second application signatures previously stored are obtained by compiling source codes of known applications and extracting information from compilation information generated during the compiling,
    wherein the identifying identifies the application by aggregating the information collected from a native library of a host of the virtual machine, and
    wherein, if two signatures are extracted from different processes of the one or more processes, keeping the two signatures as two versions of the process running at a same time,
    further comprising outputting a list of the identified one or more applications running on the virtual machine,
    wherein the extracted information related to one or more processes of one or more applications includes information related to opened resources of the processes including at least one of opened file and opened network connection,
    further comprising performing a reduce operation on the one or more processes in parallel by using MapReduce that results in a triple for each 9f the one or more processes including the virtual machine, the application, and a version of the application,
    wherein, if after the reduce operation the two triples are obtained from a same process of the one or more processes, only keeping the process with the triple of the two triples with a higher count as a correct identification result.

2. The computer-implemented method according to claim 1, wherein the information related to the one or more processes of the one or more applications includes information related to opened resources of the one or more processes, and
    wherein the reduce operation comprises a counting operation.

3. The computer-implemented method according to claim 2, wherein the extracting information related to the one or more processes of the one or more applications running on a virtual machine from a memory of the virtual machine further comprises:
    extracting information related to the opened resources based on addresses calculated from offsets of kernel objects in the kernel space of an operating system.

4. The computer-implemented method according to claim 1, wherein the one or more second application signatures previously stored are obtained by a combination of:
    compiling source codes of known applications and extracting information from compilation information generated during the compiling; and
    crowdsourcing.

5. The computer-implemented method according to claim 1, wherein the matching the at least one first application signature with one or more second application signatures previously stored further comprises matching the at least one first application signature with the one or more second application signatures in parallel.

6. The computer-implemented method according to claim 1, wherein the one or more second application signatures are usable to distinguish different versions of a same application.

7. The computer-implemented method according to claim 2, wherein the one or more second application signatures includes information related to:
    one or more opened files of an application;
    one or more opened network ports of an application; and
    operation behavior pattern for the opened resources.

8. A system for application identification, the system comprising:
    a processor; and
    a memory, the memory storing instructions to cause the processor to perform:
        extracting information related to one or more processes of one or more applications running on a virtual machine from a kernel space in a memory of the virtual machine in a cloud environment, wherein the extracting identifies the running applications based on structures related to processes stored in the kernel space which includes fixed structures in terms of positions and sizes;
        building at least one first application signature based on the extracted information; and
        identifying the one or more applications running on the virtual machine by matching the at least one first application signature with one or more second application signatures previously stored from a database in which each of the second application signatures corresponds to an application and is used as the signature of the application, wherein the second application signatures previously stored are obtained by compiling source codes of known applications and extracting information from compilation information generated during the compiling, wherein the identifying identifies the application by aggregating the information collected from a native library of a host of the virtual machine, and wherein, if two signatures are extracted from different processes of the one or more processes, keeping the two signatures as two versions of the process running at a same time, further comprising outputting a list of the identified one or more applications running on the virtual machine, wherein the extracted information related to one or more processes of one or more applications includes information related to opened resources of the processes including at least one of opened file and opened network connection, further comprising performing a reduce operation on the one or more processes in parallel by using MapReduce that results in a triple for each of the one or more processes including the virtual machine, the application, and a version of the application, wherein, if after the reduce operation the two triples are obtained from a same process of the one or more processes, only keeping the process with the triple of the two triples with a higher count as a correct identification result.

9. The system according to claim 8, wherein the information related to the one or more processes of the one or more applications includes information related to opened resources of the one or more processes, and wherein the reduce operation comprises a counting operation.

10. The system according to claim 9, wherein the extracting information related to the one or more processes of the one or more applications running on a virtual machine from a memory of the virtual machine further comprises:

extracting information related to the opened resources based on addresses calculated from offsets of kernel objects in the kernel space of an operating system.

11. The system according to claim 8, wherein the matching the at least one first application signature with one or more second application signatures previously stored further comprises matching the at least one first application signature with the one or more second application signatures in parallel.

12. The system according to claim 8, wherein the one or more second application signatures are usable to distinguish different versions of a same application.

13. The system according to claim 9, wherein the one or more second application signature includes information related to:

one or more opened files of an application;
one or more opened network ports of an application; and
operation behavior pattern for the opened resources.

14. The system according to claim 9, wherein the at least one first application signature is built for each of the one or more processes, or the at least one first application signature is built for each of the opened resources, based on the extracted information.

15. A computer program product for application identification, the computer program product comprising a computer-readable storage medium having program instructions embodied therewith, the program instructions being executable by a computer to cause the computer to perform:

extracting information related to one or more processes of one or more applications running on a virtual machine from a kernel space in a memory of the virtual machine in a cloud environment, wherein the extracting identifies the running applications based on structures related to processes stored in the kernel space which includes fixed structures in terms of positions and sizes;

building at least one first application signature based on the extracted information; and identifying the one or more applications running on the virtual machine by matching the at least one first application signature with one or more second application signatures previously stored from a database in which each of the second application signatures corresponds to an application and is used as the signature of the application, wherein the second application signatures previously stored are obtained by compiling source codes of known applications and extracting information from compilation information generated during the compiling, wherein the identifying identifies the application by aggregating the information collected from a native library of a host of the virtual machine, and wherein, if two signatures are extracted from different processes of the one or more processes, keeping the two signatures as two versions of the process running at a same time, further comprising outputting a list of the identified one or more applications running on the virtual machine, wherein the extracted information related to one or more processes of one or more applications includes information related to opened resources of the processes including at least one of opened file and opened network connection, further comprising performing a reduce operation on the one or more processes in parallel by using MapReduce that results in a triple for each of the one or more processes including the virtual machine, the application, and a version of the application, wherein, if after the reduce operation the two triples are obtained from a same process of the one or more processes, only keeping the process with the triple of the two triples with a higher count as a correct identification result.

16. The computer program product according to claim 15, wherein the information related to the one or more processes of the one or more applications includes information related to opened resources of the one or more processes, and wherein the reduce operation comprises a counting operation.

17. The computer program product according to claim 16, wherein the extracting information related to the one or more processes of the one or more applications running on a virtual machine from a memory of the virtual machine further comprises:

extracting information related to the opened resources based on addresses calculated from offsets of kernel objects in the kernel space of operating system.

18. The computer program product according to claim 15, wherein the matching the at least one first application signature with one or more second application signatures previously stored further comprises matching the at least one first application signature with the one or more second application signatures in parallel.

* * * * *